United States Patent
Jourdian et al.

(10) Patent No.: US 7,008,699 B2
(45) Date of Patent: *Mar. 7, 2006

(54) MULTICOMPONENT THERMOSET STRUCTURES

(75) Inventors: Eric P. Jourdian, Phode Saint Genese (BE); Jean-Roch H. Schauder, Wavre (BE); Leander Kenens, Kessel-Lo (BE)

(73) Assignee: Advanced Elastomer Systems, L.P., Akron, OH (US)

( * ) Notice: Subject to any disclaimer, the term of this patent is extended or adjusted under 35 U.S.C. 154(b) by 11 days.

This patent is subject to a terminal disclaimer.

(21) Appl. No.: 10/415,849

(22) PCT Filed: Dec. 21, 2001

(86) PCT No.: PCT/EP01/15205

§ 371 (c)(1),
(2), (4) Date: May 1, 2003

(87) PCT Pub. No.: WO02/051634

PCT Pub. Date: Jul. 4, 2002

(65) Prior Publication Data

US 2004/0059061 A1    Mar. 25, 2004

Related U.S. Application Data

(60) Provisional application No. 60/257,721, filed on Dec. 22, 2000.

(51) Int. Cl.
*B32B 27/32*    (2006.01)

(52) U.S. Cl. .................................. 428/517; 428/519
(58) Field of Classification Search ............... 428/519, 428/520, 516, 517
See application file for complete search history.

(56) References Cited

U.S. PATENT DOCUMENTS

| 5,611,982 | A | * | 3/1997 | Mathavan et al. | 264/131 |
| 6,565,986 | B1 | * | 5/2003 | Itoh | 428/483 |
| 2002/0136916 | A1 | * | 9/2002 | Cheung et al. | 428/517 |
| 2003/0035922 | A1 | * | 2/2003 | Yu et al. | 428/122 |
| 2004/0053067 | A1 | * | 3/2004 | Dharmarajan et al. | 428/521 |
| 2004/0059061 | A1 | * | 3/2004 | Jourdian et al. | 525/191 |

FOREIGN PATENT DOCUMENTS

EP    000601790 A1 *  6/1994

* cited by examiner

*Primary Examiner*—D. Lawrence Tarazano
(74) *Attorney, Agent, or Firm*—William G. Muller

(57) ABSTRACT

Composite structures are described that include (a) a first polymer structure (e.g., a film or solid component) made of EPDM adhered to (b) a second polymer structure (film or solid component) that is made of a blend of dynamically vulcanized EPDM dispersed in a matrix of a thermoplastic polyolefin polymer. Either the first polymer structure, or both the first and second polymer structures are blended with an effective amount of a semicrystalline random adhesive copolymer.

14 Claims, No Drawings

MULTICOMPONENT THERMOSET STRUCTURES

This applications claims the benefit of Provisional Application No. 60/257,721, filed Dec. 22, 2000.

Join Research Agreement: On 01 Jan. 1991, Exxon Corp. (now Exxon Mobil Corp.) and Advanced Elastomer Systems, L.P., executed agreements for joint research and technology sharing in the field of thermoplastic elastomer products, the field of this invention.

FIELD OF INVENTION

The present invention relates to polymer composite structures having improved adhesion properties. For example, a two component polymer composite structure is disclosed, in which one of the polymer structures is made of EPDM blended with an effective amount of a semicrystalline random adhesive copolymer, and the other polymer structure is made of a blend of dynamically vulcanized EPDM dispersed in a matrix of a thermoplastic polyolefin polymer. This second polymer structure may also be blended with a semicrystalline random adhesive copolymer.

As discussed below, certain aspects of the invention are directed to multi-layer films. Other aspects of this invention are directed to polymeric composite structures with separate polymeric components adhered to one another, where the components are not films. For example, certain composite structures form parts of motor vehicles, e.g., automobiles. These structures include elastomeric sealing structures (sometimes referred to as "sealing systems") in cars, such as extruded profiles and moldings. More specifically, such sealing structures may include glass run channels, door seals and belt line seals. Certain structures provide insulation to air, water, or noise and/or they may be configured to provide for the sliding of glass against the sealing surface. Such composite structures also may simply be part of the aesthetic design features of a car. Many components used in composite structures for automobiles are formed from polymer such as cured elastomers, e.g., EPDM, alone or blended with other polymers. The components in these composites are often adhered to one another. A continuing need exists for improved adhesion between two EPDM components or between an EPDM component and a component with a different composition, particularly at elevated temperatures, e.g., 60° C. or higher.

SUMMARY OF INVENTION

In one specific embodiment of the invention, a composite structure is disclosed that includes (a) a first polymer structure (e.g., a film or solid component) made of EPDM blended with an effective amount of a semicrystalline random adhesive copolymer adhered to (b) a second polymer structure (film or solid component) that is made of a blend of dynamically vulcanized EPDM dispersed in a matrix of a thermoplastic polyolefin polymer.

The first polymer structure contains semicrystalline random adhesive copolymer in the amount of from 5 to 50 phr (parts per hundred parts of rubber), i.e., based on the amount of EPDM or other elastomeric material. Preferably, the semicrystalline random adhesive copolymer is present in the amount of from 15 to 30 phr. More preferably, the semicrystalline random adhesive copolymer is present in the amount of 25 phr.

In another embodiment of the invention, the second polymer structure also contains semicrystalline random adhesive copolymer in an amount effective to further improve adhesion between the components of the composite structure. Preferably the semicrystalline random adhesive copolymer is present in the amount of from about 5 to about 50 weight percent, based on the weight of the thermoplastic polyolefin polymer present in the second polymer structure.

DETAILED DESCRIPTION OF INVENTION

Various specific embodiments, versions and examples of the invention will now be described, including preferred embodiments and definitions that are adopted herein for purposes of understanding the claimed invention. It is understood, however, that the scope of the "invention" will refer to the appended claims, including their equivalents, and elements or limitations that are equivalent to those that are recited. All references to the "invention" below are intended to distinguish claimed compositions and methods from compositions and methods not considered to be part of this invention. It is understood, therefore, that any reference to the "invention" may refer to one or more, but not necessarily all, of the inventions defined by the claims. References to specific "embodiments" are intended to correspond to claims covering those embodiments, but not necessarily to claims that cover more than those embodiments.

The term "polymer structure" is defined herein to include any substantially flat structure that may be adhered to one another, such as films, which include sheets, layers and the like, and in some cases the structure may be partially melted, e.g., during adhesion. The term "polymer structure" also includes any "non-flat" structure, such as a molded part that is used in automobiles, discussed above, in which case the structure may have a curved or rounded surface. However, the term "polymer structure" is defined as not including any particulate matter, such as pellets.

One of the polymer structures of the composite structures described herein are preferably "thermoplastic" materials, which term as used herein refers to a plastic that can be repeatedly softened by heating and hardened by cooling. Also, one or both of the polymer structures of the composite structures described herein may also include thermoset or thermosetting plastics. The terms "thermoset" and "thermosetting plastic" as used herein are defined as referring to any plastic that hardens permanently after being heated once. Preferably, the EPDM structures are crosslinked. The term "crosslinked" as used herein refers to any material that has been subjected to a procedure that causes crosslinking in the polymer chain, e.g., to create branching. A material can be crosslinked by curing or vulcanizing. Thus, for example, a crosslinked elastomeric material may include a vulcanized EPDM.

A specific embodiment of the invention relates to a composite structure that includes a first polymer structure, for example a film or solid component (which may be either dense or foamed) made of EPDM blended with an effective amount of a semicrystalline random adhesive copolymer adhered to a second polymer structure (film or solid component) that is made of a blend of dynamically vulcanized EPDM dispersed in a matrix of a thermoplastic polyolefin polymer. An example of the latter blend is one sold under the trademark Santoprene, and is available from Advanced Elastomer Systems, L.P., Akron, Ohio.

In this specific embodiment, the first polymer structure contains semicrystalline random adhesive copolymer in the amount of from 5 to 50 phr (parts per hundred parts of rubber), i.e., based on the amount of EPDM or other elastomeric material. Preferably, the semicrystalline random adhesive copolymer is present in the amount of from 15 to 30 phr. More preferably, the semicrystalline random adhesive copolymer is present in the amount of 25 phr.

In a specific embodiment, a composite structure has a first polymer structure that is made from an elastomeric material, preferably an EPDM, and additionally includes one or more of the ingredients specified in Table 1 below, or their chemical equivalent, and a second polymer structure that is made from a thermoplastic elastomer (TPE) blend as disclosed elsewhere herein, e.g., a blend of dynamically vulcanized EPDM or other elastomeric material or TPE dispersed in a matrix of a thermoplastic polyolefin polymer, e.g., an isotactic polypropylene or an ethylene-propylene copolymer.

In a specific embodiment, a composite structure having the properties identified in Table 8 is provided. For example, a specific embodiment of this invention includes a composite film structure having substantially improved adhesion properties. Also, for example, a specific embodiment includes a two-component composite structure in which one of the polymer components includes EPDM blended with a semicrystalline random copolymer in an amount of 5 to 50 phr, preferably 15 to 30 phr, more preferably 25 phr. Preferably, that composite structure has energy at break of adhesion that is 50% greater than a two-component composite structure that includes a polymer component with EPDM but not any semicrystalline random copolymer. Also, preferably, the adhesion failure mode in the structure that includes the semicrystalline random copolymer is shifted from adhesive to cohesive, demonstrating thermoplastic stock failure at room temperature and preferably also at elevated temperature (70° C.).

Thermoplastic Elastomer Component

The composite structure of this invention includes what is sometimes referred to as a "second polymer structure," i.e., the polymer structure that includes a dynamically vulcanized EPDM or other elastomer and a thermoplastic polyolefin polymer. A number of blends can be used to form the second polymer structure, which are described below, or are identified in the patents that are incorporated by reference. A thermoplastic elastomer (TPE) can be generically defined as a rubber-like material that, unlike conventional rubbers, can be processed and recycled like thermoplastic materials (ASTM D 1566). When the TPE contains a vulcanized rubber, it may also be referred to as a thermoplastic vulcanizate (TPV), defined as a TPE with a chemically cross-linked rubbery phase, produced by dynamic vulcanization (ASTM D 1566). The term "dynamically vulcanized" refers in general to a material that has been subjected to "dynamic vulcanization," a term that is herein intended to include a vulcanization process in which a thermoplastic polyolefin resin and a vulcanizable elastomer are vulcanized under conditions of high shear. As a result, the vulcanizable elastomer is simultaneously crosslinked and dispersed as fine particles of a "micro gel" within the engineering resin.

As used herein, the terms TPE and TPV refer to a blend of thermoplastic polyolefin resin and at least partially vulcanized rubber. Such materials have the characteristic of elasticity, i.e. they are capable of recovering from large deformations quickly and forcibly. One measure of this rubbery behavior is that the material will retract to less than 1.5 times its original length within one minute, after being stretched at room temperature to twice its original length and held for one minute before release (ASTM D 1566). Another measure is found in ASTM D 412, for the determination of tensile set. the materials are also characterized by high elastic recovery, which refers to the proportion of recovery after deformation and may be quantified as percent recovery after compression. A perfectly elastic material has a recovery of 100% while a perfectly plastic material has no elastic recovery. Yet another measure is found in ASTM D 395, for the determination of compression set.

Procedures for dynamically vulcanizing materials, and the materials that can be included in the second polymer structure herein are disclosed in U.S. Pat. Nos. 4,311,628 and 5,672,660, incorporated herein by reference for purposes of United States patent practice. In addition to or instead of EPDM, the second polymer structure can also include other TPEs. Examples of TPEs are disclosed in U.S. Pat No. 6,147,180, incorporated herein by reference for purposes of United States patent practice.

A further specific embodiment includes a two-component composite structure as described above in which both polymer components are blended with a semicrystalline random copolymer. That is, the second polymer structure also includes a semicrystalline random copolymer in an amount of from about 5 to about 50 weight percent, preferably from about 10 to about 20 weight percent, of semicrystalline random copolymer, based on the weight of the thermoplastic polyolefin polymer present in the second polymer structure. In this embodiment the energy at break of adhesion is further improved over the embodiment wherein the semicrystalline random copolymer is blended only with the EPDM component.

Semicrystalline Random Copolymer Component

The composite structures described herein include a "semicrystalline random copolymer" (SRC). The term "random copolymer" as used herein is defined as a copolymer in which the distribution of the monomer residues is consistent with the random statistical polymerization of the monomers, and includes copolymers made from monomers in a single reactor, but does not include copolymers made from monomers in series reactors, which are defined herein to be "block copolymers." The random copolymer discussed herein is preferably "semicrystalline," meaning that in general it has a relatively low crystallinity, as will be discussed more specifically below. This semicrystalline random copolymer preferably includes 70–88 mole % propylene units and alpha olefin units having 2 carbon atoms (ethylene units) or from 4 to 10 carbon atoms, e.g., butene units or octene units. Thus, in a specific embodiment, a preferred semicrystalline random copolymer is a polypropylene polymer, specifically a propylene-ethylene copolymer, in which a substantial number of the copolymer units, e.g., 70–88 mole % of them, are propylene units. That semicrystalline random copolymer is thus distinguishable from copolymers made of propylene and ethylene units that have fewer than 70 mole % propylene units, including conventional polyethylene polymers having some amount of propylene. It has been discovered that superior adhesive properties can be obtained using one or more of the semicrystalline random copolymers described herein.

The semicrystalline random copolymer used in specific embodiments of this invention preferably has a crystallinity of from 2% to 65% of the crystallinity of isotactic polypropylene. The term "crystalline" as used herein broadly characterizes those polymers that possess a high degree of both inter and intra molecular order, and which preferably melt higher than 110° C., more preferably higher than 115° C., and most preferably above 130° C. A polymer possessing a high inter and intra molecular order is said to have a "high" level of crystallinity, while a polymer possessing a low inter and intra molecular order is said to have a "low" level of crystallinity. Crystallinity of a polymer can be expressed quantitatively, e.g., in terms of percent crystallinity, usually with respect to some reference or benchmark crystallinity. As used herein, crystallinity is measured with respect to isotactic polypropylene homopolymer. Preferably, heat of fusion is used to determine crystallinity. Thus, for example, assuming the heat of fusion for a highly crystalline polypropylene homopolymer is 190 J/g, a semicrystalline random copolymer having a heat of fusion of 95 J/g will have a crystallinity of 50%. The term "crystallizable" as used herein refers to those polymers or sequences that are mainly amorphous in the undeformed state, but upon stretching or annealing, become crystalline. Thus, in certain specific embodiments, the semicrystalline random copolymer can be crystallizable.

The random semicrystalline copolymer preferably comprises a copolymer of propylene and at least one comonomer selected from the group consisting of ethylene and at least one $C_4$ to $C_{20}$ alpha-olefin, preferably having an average propylene content of from at least about 70 mol % and more preferably from at least about 73 mol %, and most preferably from at least about 85 mol %. Further, the propylene copolymer has a weight average molecular weight (Mw) preferably from about 15,000 to about 200,000 Daltons; more preferably between about 50,000 and about 150,000 Daltons; and most preferably between about 65,000 and about 100,000 Daltons. The semi-crystalline propylene copolymer preferably has a melt index (MI) as measured by ASTM D 1238(B) of from about 3000 dg/min to about 7 dg/min, more preferably from about 20 dg/min to about 900 dg/min, and most preferably from about 78 to about 630 dg/min. Additionally, the semi-crystalline propylene copolymer can have a melt index of from about 10 dg/min to about 2500 dg/min, or from about 15 dg/min to about 2000 dg/min. The propylene sequences in the propylene copolymer may be either isotactic propylene sequences or syndiotactic propylene sequences, preferably isotactic sequences. The crystallinity in the propylene copolymer is to be derived from either the isotactic or syndiotactic propylene sequences.

The semicrystalline polymer (SRC) can be a thermoplastic copolymer, preferably random, of ethylene and propylene having a melting point by Differential Scanning Calorimetry (DSC) analysis (ASTM E-794–95) of from about 25° C. to about 120° C., preferably in the range of from about 30° C. to about 110° C., more preferably in the range of from about 65° C. to about 100° C. The semi-crystalline polymer preferably has a weight average molecular weight/number average molecular weight ratio (Mw/Mn) of approximately 2. A preferred semi crystalline polymer used in the present invention is described in detail as the "First Polymer Component" in co-pending U.S. application Ser. No. 60/133,966, filed May 13, 1999, which is incorporated by reference herein for the purpose of United States patent practice. The semi-crystalline polymer preferably has a heat of fusion from about 30 J/g to about 80 J/g as determined by DSC, more preferably from about 40 J/g to about 70 J/g as determined by DSC, and most preferably from about 50 J/g to about 65 J/g as determined by DSC.

A preferred procedure used in the present application for Differential Scanning Calorimetry (DSC) is described as follows. Preferably, about 6 mg to about 10 mg of a sheet of the preferred polymer pressed at approximately 200° C. to 230° C. is removed with a punch die and is annealed at room temperature for 48 hours. At the end of this period, the sample is placed in a Differential Scanning Calorimeter (Perkin Elmer 7 Series Thermal Analysis System) and cooled to about −50° C. to −70° C. The sample is heated at about 10° C./min to attain a final temperature of about 180° C. to about 200° C. The thermal output is recorded as the area under the melting peak of the sample which is typically at a maximum peak at about 30° C. to about 175° C. and occurs between the temperatures of about 0° C. and about 200° C. The thermal output is measured in Joules as a measure of the heat of fusion. The melting point is recorded as the temperature of the greatest heat absorption within the range of melting temperature of the sample.

A SRC of the present invention preferably comprises a random crystallizable copolymer having a narrow compositional distribution. The term "crystallizable," as used herein for SRC, describes those polymers or sequences which are mainly amorphous in the undeformed state, but can crystallize upon stretching, annealing or in the presence of a nucleating agent, such as a crystalline polymer or a crystalline segment within the polymer. Crystallization is measured by DSC, as described herein. While not meant to be limited thereby, it is believed that the narrow composition distribution of the first polymer component is important. The intermolecular composition distribution of the polymer is determined by thermal fractionation in a solvent. A typical solvent is a saturated hydrocarbon such as hexane or heptane. This thermal fractionation procedure is described in previously mentioned U.S. Ser. No. 60/133,966. Typically, approximately 75 weight % and more preferably 85 weight % of the polymer is isolated as a one or two adjacent, soluble fraction with the balance of the polymer in immediately preceding or succeeding fractions. Each of these fractions has a composition (mol % ethylene content) with a difference of no greater than 27 mol % (relative) and more preferably 14 mol % (relative) of the average mol % ethylene content of the whole first polymer component. The first polymer component is narrow in compositional distribution if it meets the fractionation test outlined above.

In semi-crystalline polymers, the length and distribution of stereo-regular propylene sequences is consistent with the substantially random statistical crystallizable co-polymerization. It is well known that sequence length and distribution are related to the co-polymerization reactivity ratios. By substantially random, we mean copolymer for which the product of the reactivity ratios is preferably 2 or less, more preferably 1.5 or less, and most preferably 1.2 or less.

In stereo-block structures, the average length of PP sequences is greater than that in substantially random copolymers with a similar composition. Prior art polymers with stereo-block structure have a distribution of PP sequences consistent with these blocky structures rather than a substantially random statistical distribution. To produce a crystallizable copolymer with the required randomness and narrow composition distribution, it is desirable to use (1) a single sited catalyst and (2) a well-mixed, continuous flow stirred tank polymerization reactor which allows only a single polymerization environment for substantially all of the polymer chains of the first polymer component.

The SRC comprises preferably isotactically crystallizable alpha-olefin sequences, e.g., preferably propylene sequences (NMR). The crystallinity of the first polymer component is, preferably, according to one embodiment, from 1% to 65% of isotactic polypropylene, preferably between 3% to 30%, as measured by the heat of fusion of annealed samples of the polymer. The SRC preferably has a poly dispersity index (PDI) or Mw/Mn between 1.5 to 40, more preferably between about 1.8 to 5 and most preferably between 1.8 to 3. Preferably, the SCP has a Mooney viscosity of ML (1+4)@125° C. less than 40, more preferably less than 20 and most preferably less than 10. It is preferred that the SRC has a melt index (MI) at 190° C. of less than about 1500 dg/min, more preferably less than about 900 dg/min, and most preferably less than 650 dg/min. Further, the semi-crystalline propylene copolymer can also have a melt index of from about 10 dg/min to about 2500 dg/min, or from about 15 dg/min to about 2000 dg/min, or even more broadly from about 7 dg/min to about 3000 dg/min.

The low levels of crystallinity in certain specific embodiments of the SCP can be obtained by incorporating from about 0.5 to 50 mol % alpha-olefin, preferably from about 0.9 to about 35 mol % alpha-olefin; more preferably, it comprises from about 1.3 to about 37 mol % alpha-olefin, and; most preferably between about 1.3 to about 15 mol % alpha-olefin. Alpha olefins are defined herein to comprise one or more members of the group consisting of ethylene and $C_4$-$C_{20}$ alpha-olefin. At alpha-olefin compositions lower than the above lower limits for the composition of the SCP, the blends of the SCP are thermoplastic. At alpha-olefin compositions within the stated desired ranges, the blends exhibit superior tensile strength. At alpha-olefin compositions higher than the above higher limits for the SOP, the blends have poor tensile strength It is believed, while not meant to be limited thereby, the SCP needs to have the optimum amount of isotactic polypropylene crystallinity to crystallize for the beneficial effects of the present invention. As discussed above, the most preferred co-monomer is ethylene.

Rubber Component

The term "rubber" for the purposes of this application is considered to encompass all elastomeric polymers and plastics, such as but not limited to ethylene—alpha-olefin—diene monomer terpolymer, particularly EPDM; ethylene propylene rubber (EPR); butyl rubber, halobutyl rubber, styrene-isoprene-styrene (SIS); styrene-butadiene copolymers (SBC); polyisoprene rubber; polyisobutylene rubber (PIB); styrene-butadiene-styrene (SBS); styrene-butadiene rubber (SBR); polybutadiene rubber (BR); blends of said elastomeric polymers, as well as blends of these rubbers with thermoplastics. The preferred rubber component is a polymer derived from ethylene, one or more alpha-olefins, and one or more non-conjugated diene monomers. The preferred ethylene content is from about 35 to about 85 weight percent, based on the total weight of the ethylene—alpha-olefin—diene monomer terpolymer, preferably from about 40 to about 80 weight percent, and more preferably from about 45 to about 75 weight percent.

The diene monomer can be one or more non-conjugated dienes containing 30 carbon atoms or less, more preferably 20 carbon atoms or less. The preferred non-conjugated dienes include, but are not limited to one or more of 5-ethylidene-2-norbornene (ENB); 1,4-hexadiene; 1,6-octadiene; 5-methyl-1,4-hexadiene; 3,7-dimethyl-1,6-octadiene; vinylnorbornene; dicyclopentadiene; and combinations thereof. The preferred non-conjugated diene content is from about 1 to about 15 weight percent, based on the total weight of the ethylene—alpha-olefin—diene monomer terpolymer, and preferably from about 2 to about 11 weight percent.

Alpha-olefin will make up the remainder of the ethylene—alpha-olefin—diene monomer terpolymer, with percentages adding up to 100 weight percent. The preferred alpha-olefins include, but are not limited to $C_3$, $C_4$, $C_6$, $C_8$, and higher molecular weight alpha-olefins. More preferably, the alpha-olefin is propylene.

Ethylene—alpha-olefin—diene monomer terpolymers can be prepared using a conventional polymerization process, including traditional Ziegler-Natta catalysts, as well as metallocene catalysts. Synthesis of ethylene—alpha-olefin—diene monomer terpolymers is well known in the art. Reference may be had to G. ver Strate, *Encyclopedia of Polymer Science and Engineering*, vol. 6, pp. 522–564 (2nd Ed., 1986).

In one embodiment, the rubber component is Vistalon™ 9500 available from ExxonMobil Chemical Company, Baytown, Tex. Vistalon™ 9500 is a polymer of ethylene-propylene-ethylidene norbornene having following typical properties:

| | |
|---|---|
| Mooney Viscosity, ML 1 + 4, 125° C. | 72 |
| Ethylene content, weight %: | 60 |
| ENB, weight % | 11 |

Carbon black used in the reinforcement of rubber, generally produced from the combustion of a gas and/or a hydrocarbon feed and having a particle size from 20 nm to 100 nm for the regular furnace or channel black or from 150 to 350 nm for the thermal black. Level in the compound may range from 10 to 300 parts per 100 parts of elastomeric polymer (phr).

Processing oil, preferably paraffinic, is added to adjust both the viscosity of the compound for good processing and its hardness in the range of 50 to 85 Shore A. Level in the compound may vary from 0 to 200 parts per hundred of elastomeric polymer(phr).

Zinc oxide and stearic acid are added to activate the accelerators and attain a good crosslink density. Typical quantities are between 0 to 20 phr of Zinc oxide and 0 to 5 phr of stearic acid.

Vulcanizing agents are used to cause the chemical reaction resulting in crosslinking the elastomer molecular chains. Typical are sulfur (0 to 10 phr), sulfur donor like thiuram disulfides (tetramethyl thiuram disulfide) and thiomorpholines (dithio dimorpholine) in the range of 0 to 10 phr).

Accelerators are used to reduce the vulcanization time by increasing the speed of the crosslinking reaction. They are typically thiazoles (2-mercaptobenzo thiazole or mercaptobenzo thiazol disulfide), guanidines (diphenyl guanidine), dithiocarbamates (zinc dimethyldithio carbamate, zinc diethyldithio carbamate, zinc dibutyldithio carbamate), and others well known by the one skilled in the art of rubber compounding. All can be used in the range of 0 to 5 phr.

Beside sulfur vulcanization systems, peroxides can also be used as curative. Vulcanization is described in Chapter 7 of *Science and Technology of Rubber*, Academic Press Inc., 1978.

Whether sulfur or peroxide cured, the first polymer structure made of EPDM described herein is substantially fully cured, but is in no way partially cured. By fully cured we intend that the cured parts are thermoset, that is the cured part can not be replasticized, nor melt reprocessable.

Use of the terms parts per hundred parts rubber (phr) and the term parts per hundred elastomeric polymer, are considered equivalent for purposes of this application. Use of the term "compound" for purposes of this application includes the EPDM polymer and one or more of the above described ingredients.

A rubber compounder or fabricator for automotive body parts will plasticize or masticate the elastomer while adding materials such as reinforcing materials, diluting fillers, vulcanizing agents, accelerators, and other additives which would be well known to those of ordinary skill in the art, to produce an elastomer compound for use in automotive sealing. Generally, such plasticization, mastication, and/or compounding, or both, takes place in a rolkl mill or an internal kneader, such as a Banbury mixer or the like. After compounding, the materials are then fed to a device which can meter the compound (often an extruder) and force (screw of an extruder, piston of a press) the compounded elastomer into molding cavities or dies for shaping and curing. Curing can take place in heated mold cavity or in heat transferring devices continuously like hot air oven, possibly coupled with microwave oven or bath containing a heated liquid salt medium.

The term "melting point" for a material as used herein is defined as the highest peak among principal and secondary melting peaks as determined by DSC, discussed above. Techniques for determining the molecular weight (Mn and Mw) and molecular weight distribution (MWD) are found in U.S. Pat. No. 4,540,753 and the references cited therein, incorporated herein by reference for the purposes of United States patent practice, as well as in *Macromolecues* 1988, vol. 21, p. 3360.

The "composition distribution" of copolymers can be measured according to the following procedure. About 30 g of the copolymer is cut into small cubes about ⅛ inch per side. These cubes are introduced into a thick walled glass bottle closed with screw cap along with 50 mg of Irganox 1076, an antioxidant commercially available from Ciba-Geigy Corporation. Then, 425 ml of hexane (a principle mixture of normal and iso isomers) is added to the contents of the bottle and the sealed bottle is maintained at about 23° C. for about 24 hours. At the end of this period, the solution is decanted and the residue is treated with additional hexane for an additional 24 hours. At the end of this period, the two hexane solutions are combined and evaporated to yield a residue of the polymer soluble at 23° C. To the residue is added sufficient hexane to bring the volume to 425 ml and the bottle is maintained at about 31° C. for 24 hours in a covered circulating water bath. The soluble polymer is decanted and the additional amount of hexane is added for another 24 hours at about 31° C. prior to decanting. In this manner, fractions of the copolymer component soluble at 40° C., 48° C., 55° C., and 62° C. are obtained at temperature increases of approximately 8° C. between stages. Further, increases in temperature to 95° C. can be accommodated, if heptane, instead of hexane, is used as the solvent for all temperatures about 60° C. The soluble polymers are dried, weighed and analyzed for composition, as for example by weight percent ethylene content, by an infrared spectrophotometer techniques described below. Soluble fractions obtained in the adjacent temperature increases are the adjacent fractions in the specification above. A polymer is said to have a "narrow compositional distribution" herein when at least 75 weight percent of the polymer is isolated in two adjacent soluble fractions, each fraction having a composition difference of no greater than 20% of the average weight percent monomer content of the average first polymer component.

Certain specific embodiments can include a copolymer with a specified ethylene "composition." The ethylene composition of a polymer can be measured as follows. A thin homogeneous film is pressed at a temperature of about 150° C. or greater, then mounted on a Perkin Elmer PE 1760 infrared spectrophotometer. A full spectrum of the sample from 600 cm$^{-1}$ to 400 cm$^{-1}$ is recorded and the monomer weight percent of ethylene can be calculated according to the following equation: Ethylene wt %=82.585−111.987X+ 30.045 X$^2$, wherein X is the ratio of the peak height at 1155 cm$^{-1}$ and peak height at either 722 cm$^{-1}$ or 732 cm$^{-1}$, whichever is higher. The concentrations of other monomers in the polymer can also be measured using this method.

Applications

This invention includes certain extruded elastomeric polymer profiles generally for use as a vehicle sealing system, especially such sealing systems known as glass run channel, door seal or belt line seal, the use of such sealing systems in vehicles and the vehicles containing such systems. Also contemplated is the fabrication of the glass run channel, door seal or belt line seal which may include coloring, low friction coating, thermoplastic veneer or thermoplastic overmolding. The resulting sealing systems have combinations of properties rendering them superior and unique to profiles previously available. The elastomeric polymer profiles disclosed herein are particularly well suited for use in producing certain classes of vehicle sealing systems, glass run channel, door seal or belt line seal and vehicles using the profiles in combination with thermoplastic elastomers. Vehicles contemplated include, but are not limited to passenger autos, trucks of all sizes, farm vehicles, trains, and the like.

In an automobile, there are different types of sealing with different functions, therefore constructed with different structure. For example the most common are door seal, glass run channel and belt line seal:

1. Door seal, where three different rubber compounds may be used. A microcellular profile is in contact with the car body frame, providing by compression, adequate sealing against water, air and aerodynamic noise. A metal carrier compound, generally rigidified by a flexible stamped metal co-extruded with the rubber, holds the sponge portion and is further gripped on the car body. Soft rubber lips inside the metal carrier provide a tight link between the rubber components and the metallic body frame of the car. Up to now, door seals have generally been manufactured by using EPDM type rubber generally without any other material addition.

2. Glass run channel is another profile generally composed of one type of rubber extruded in such form that the glass is guided during the rewinding operation and then insure good insulation when the glass is closed. Movement in the channel is generally facilitated by a flock deposit inside the rubber channel. This flock is adhered to the rubber with a curable cement, generally chloroprene based.

3. inner or outer belt line seal is a rubber profile composed generally of two coextruded parts: one flexible portion against the glass and modified as described above to facilitate the motion of the glass, and one stiff portion rigidified generally with a metal, steel or aluminum coextruded with the rubber compound.

Such elastomeric profiles can also be used in other applications than automotive, like railway cars, building and construction.

EXAMPLES

Characterization of EPDM

TABLE 1

| Parameter | Units | Test |
|---|---|---|
| EPDM Structural Compositions* | | |
| Mooney Viscosity | ML 1 + 4, 125° C., MU | ASTMD 1646 |
| Ethylene | Weight % | ASTMD 3900 |
| Ethylidene Norbornene | Weight % | ASTMD 6047 |

*ethylene, alpha-olefin, diene monomer elastomeric polymer

Characterization of EPDM Compound

TABLE 2

| Compound Properties | Units | Test |
|---|---|---|
| Mooney Viscosity | ML 1 + 4, 100° C., MU | ASTM D 1646 |
| Mooney Scorch time | Ts$_{2, 5 \text{ or } 10}$, 125° C., minutes | ASTM D 1646 |
| Oscillating Disk Rheometer (ODR) @ 180° C., ±3° arc | | ASTM D 2084 |
| ML | dN.m | |
| MH | dN.m | |
| Ts2 | minute | |
| T$_{90}$ | minute | |
| Cure rate | dN.m minute | |
| Physical Properties, press cured 10 minutes @ 180° C. | | |
| Hardness | Shore A | ISO 7619–1986 |
| 100% Modulus | Mpa | ISO 37–1977 type 2 |
| Tensile Strength | Mpa | ISO 37–1977 type 2 |
| Elongation at Break | % | ISO 37–1977 type 2 |
| Compression Set, press cured 8 min. @ 180° C. | | |
| 22 hrs/70° C./25% deflection | % | ISO 815–1972(E Exxon test (see below) |
| Substrate Adhesion on thermoplastic elastomers (peeling at 100 mm/min) | | |
| Force at break | Mpa | |
| Elongation at break | % | |
| Energy at break | mJ | |

The polymer structure made of EPDM is compounded in a laboratory internal mixer tangential type Farrel 1.6 liter capacity; Masterbaches were mixed in a first pass and then finalized with addition of curatives in a second pass.

Laboratory testing of adhesion of rubber to substrate are made with molded samples.

Thermoplastic elastomer is molded onto a fully cured thermoset elastomeric EPDM pad. This EPDM pad is inserted in a special mold designed to simulate the material flow like in mold for end cap or corner parts. This mold has a dimension of 60×60×3 mm. Injection conditions are described in table 3.

TABLE 3

| Injection press temperature profile | 200–230 –260 –260° C. |
|---|---|
| Mold temperature | 40° C. |
| Injection speed | 150 mm/sec. |
| Injection Pressure | 35 bar |
| Post injection pressure | 50% of initial pressure |
| Post injection time | 10 seconds |
| Cooling time | 30 seconds |

Adhesion test is carried out with following conditions: a series of S 2 dumbbells is die cut perpendicular to the injected material, so that the dumbbell is composed of half of the thermoplastic elastomer and by half of the elastomeric material. The adhesion force is measured by clamping the dumbbell in an Instron extensiometer and pulled at a speed of 100 mm/minute.

Example 1

This example describes preparation of a specific composite structure that includes one polymer structure (film) made of EPDM blended with an effective amount of a semicrystalline random adhesive copolymer adhered to another polymer structure (film) made of a blend of dynamically vulcanized EPDM dispersed in a matrix of a thermoplastic polyolefin polymer. The latter blend is sold under the trademark Santoprene, and is available from Advanced Elastomer Systems, L.P.

In this example, two EPDM polymer films were made, differing in that the second EPDM polymer film (Compound II) included a semicrystalline random copolymer adhesive having a Mooney visocisty (ML 1+4, 125° C.) of 12, a melting point of 75° C., a propylene content of 84.9 mol % and an MFR of 2.8 g/10 min (190° C., 2.16 kg, while the first EPDM polymer film (Compound I) had none of the copolymer. Table 4 shows the ingredients used to make each of the two EPDM films. Tables 5 and 6 show the properties of the polymer films made of EPDM. Films made of Compounds I and II were then adhered to films prepared from a grade of Santoprene thermoplastic elastomer formulated to have enhanced adhesion to engineering resins, as described in published International patent application WO 00/37553, incorporated herein by reference for the purpose of United States patent practice. The adhesion properties of the resulting composite film structures are reported in Table 8. The composite film structure that included the semicrystalline random copolymer showed substantially improved adhesion properties. It was observed, for example, that the energy at break of adhesion was increased by 50% over the composite film that did not include the semicrystalline random copolymer, and actually shifted the adhesion failure mode from adhesive to cohesive (thermoplastic stock failure) both at room temperature and at elevated temperature (70° C.).

TABLE 4

| Compound Batch, in phr (part per hundred of rubber) | Compound I | Compound II |
|---|---|---|
| EPDM Vistalon ™ 9500 | 100 | 100 |
| SRC with high C3 fraction | 0 | 25 |
| Spheron ™ 5000 | 130 | 130 |
| Flexon ™ 815 | 80 | 80 |
| Zinc Oxide | 5 | 5 |
| Stearic Acid | 1 | 1 |
| Calcium Oxide 80% | 5 | 5 |
| Sulfur | 1.5 | 1.5 |
| MBT (75%) | 0.8 | 0.8 |
| DPTT (75%) | 1.3 | 1.3 |
| ZDBDC (80%) | 1.3 | 1.3 |
| DPG | 0.5 | 0.5 |
| Total Weight | 326.4 | 351.4 |

Rheology of the compounds and cure characteristics are described in table 5.

TABLE 5

| | | |
|---|---|---|
| Mooney Viscosity ML (1 + 4), 100° C., M.U | 57 | 43 |
| Mooney Scorch, 125° C. Ts 5, minutes | 4.5 | 5.5 |
| ODR ±3° arc, 180° C. | | |
| ML, dN.m | 9 | 6 |
| MH, dN.m | 68 | 49 |
| MH-ML, dN.m | 59 | 43 |
| Ts$_2$, min | 0.5 | 0.6 |
| T$_{90}$, min | 2.0 | 2.5 |
| Cure rate dN.m/min | 99 | 58 |

Physical characteristics of the thermoset elastomeric compound are measured after curing in a press for 5 minutes at 180° C. Results are described in table 6.

TABLE 6

| Physical Properties, Press cured 5 minutes at 180° C. | Compound I | Compound II |
|---|---|---|
| Hardness, shore A | 71 | 71 |
| 100% Modulus, MPa | 4.7 | 4.2 |
| Tensile Strength, MPa | 11 | 9.6 |
| Elongation at break, % | 255 | 265 |
| Compression Set 22 hrs/70° C./25% def, % | 23 | 53 |

Thermoplastic elastomer available from Advanced Elastomer System. (blend of dynamically cured EPDM dispersed in a matrix of thermoplastic polyolefin polymers) is ready to use as available from the vendor, without compounding, has physical properties described in table 7

TABLE 7

| Tensile strength, MPa | 3.9 |
|---|---|
| Elongation @ break, % | 680 |
| Energy @ break, mJ | 2650 |

Adhesion results are described in the table 8:

TABLE 8

| Elastomeric rubber | Thermoset reference compound | Modified thermoset compound |
|---|---|---|
| Thermoplastic elastomer | Santoprene TPE | Santoprene TPE |
| Test at 23° C. | | |
| Adhesion Force, MPa | 3.1 | 3.5 |
| Elongation @ break, % | 520 | 670 |
| Energy @ break, mJ | 1570 | 2350 |
| Test at 70° C. | | |
| Force at break, MPa | 1.2 | 1.5 |
| Elongation @ break, % | 345 | 490 |
| Energy @ break, mJ | 413 | 730 |

A cohesive failure (tear in the thermoplastic elastomer portion) is obtained when an elastomeric material modified with the elastomer containing large fraction of propylene is used. This is achieved at both room temperature and 70° C.

Example 2

Composite structures are prepared from a first polymer of EPDM, adhered to a second polymer of a blend of dynamically vulcanized EPDM dispersed in a matrix of a thermoplastic polyolefin polymer. The second polymer was a general purpose grade of thermoplastic elastomer having no enhanced adhesive properties (Santoprene thermoplastic vulcanizate from Advanced Elastomer Systems, L.P.).

In this example both the first and second polymer included semicrystalline random copolymer (SRC) described in Example 1. The amount of semicrystalline random copolymer in the first polymer (EPDM) was maintained at a constant 25 phr. The amount of semicrystalline random copolymer in the second polymer was varied by replacing a portion of the thermoplastic polyolefin polymer (polypropylene) with the semicrystalline random copolymer. The amount of semicrystalline random copolymer in the second polymer was varied over the range from 0 to 35 weight percent of the weight of the thermoplastic polyolefin polymer in the second polymer.

The composition and properties of the composite structures are set forth in Table 9. The structures which included the semicrystalline random copolymer in both the first and second polymer components showed substantially improved adhesion properties at ambient temperature over the composite which included the semicrystalline random copolymer in only the EPDM component.

TABLE 9

| Sample | $SRC^1$ in EPDM (phr) | SRC in TPE (wt. %) | $Modulus^2$ (100%) | $Elongation^2$ at break (%) | $UTS^2$ (MPa) | $Energy^3$ (mJ) |
|---|---|---|---|---|---|---|
| 3 | 25 | 0 | 2.8 | 104 | 2.8 | 294 |
| 4 | 25 | 10 | 2.5 | 170 | 3 | 503 |
| 5 | 25 | 15 | 2.8 | 148 | 3.2 | 474 |
| 6 | 25 | 17.5 | 2.6 | 481 | 6.3 | 3030 |
| 7 | 25 | 25 | 2.1 | 401 | 4.3 | 1730 |
| 8 | 25 | 30 | 1.8 | 352 | 3.5 | 1216 |
| 9 | 25 | 35 | 1.8 | 457 | 4.8 | 2194 |

[1] semicrystalline random copolymer
[2] ASTM D412-92 at 23° C.
[3] UTS × Elongation at break

What is claimed is:

1. An elastomeric sealing structure comprising: (a) a first polymer structure made of an thermoset EPDM material blended with from 5 to 50 phr of a semicrystalline random copolymer adhered to (b) a second polymer structure made of a blend of a dynamically vulcanized elastomeric material dispersed in a matrix of a thermoplastic polyolefin polymer, wherein said sealing structure is one of extruded profiles or moldings.

2. The composite structure of claim 1 in which the semicrystalline random copolymer is present in the amount of from 15 to 30 phr, based on the EPDM material.

3. The composite structure of claim 1 in which the semicrystalline random copolymer has a crystallinity of from 2% to 65% of the crystallinity of isotactic polypropylene.

4. The composite structure of claim 1 in which the semicrystalline random copolymer includes 70–88 mole % propylene units and alpha olefin units having 2 carbon atoms or from 4 to 10 carbon atoms.

5. The composite structure of claim 1 in which the second polymer structure is made from a blend of dynamically vulcanized EPDM dispersed in a matrix of a propylene polymer.

6. The composite structure of claim 5 in which composite structure has energy at break of adhesion at least 50% greater than the energy at break of adhesion of a composite structure in which the elastomeric material of the first and second polymer structures include EPDM but do not include semicrystalline random copolymer.

7. The composite structure of claim 1 in which the first polymer structure and the second polymer structure are both non-film structures.

8. The sealing structure of claim 1 wherein said structure is for an automobile and is selected from the group consisting of glass run channels, door seals, belt line seals, insulation, roof seals, trunk seals and hood seals.

9. The composite structure of claim 1 in which the second polymer structure (b) also contains from 5 to 50 weight percent of a semicrystalline random copolymer, based on the weight of the thermoplastic polyolefin polymer in (b).

10. The composite structure of claim 9 in which the semicrystalline random copolymer is present in an amount of from 10 to 20 weight percent.

11. The composite structure of claim 9 in which the semicrystalline random copolymer has a crystallinity of from 2% to 65% of the crystallinity of isotactic polypropylene.

12. The composite structure of claim 9 in which the semicrystalline random copolymer includes 70–88 mole % propylene units and alpha olefin units having 2 carbon atoms or from 4 to 10 carbon atoms.

13. The composite structure of claim 9 in which the second polymer structure is made from a blend of dynamically vulcanized EPDM dispersed in a matrix of a propylene polymer.

14. The composite structure of claim 9 in which the elastomeric materials in the first and second polymer structures comprise EPDM, and the composite structure has energy at break of adhesion at least 50% greater than the energy at break of adhesion of a composite structure in which the elastomeric material of the first and second polymer structures include EPDM but in which the second polymer structure does not include semicrystalline random copolymer.

* * * * *